(12) United States Patent
Zirkl et al.

(10) Patent No.: US 9,612,690 B2
(45) Date of Patent: Apr. 4, 2017

(54) PRINTED PIEZOELECTRIC PRESSURE SENSING FOIL

(75) Inventors: Martin Zirkl, Gleisdorf (AT); Barbara Stadlober, Graz (AT); Michael Haller, Pasching (AT); Patrick Greindl, Hagenberg (AT); Christian Rendl, Linz (AT)

(73) Assignees: FH-OÖ Forschungs and Entwicklungs GmbH, Hagenberg (AT); Joanneum Research Forschungsgesellschaft MBH, Graz (AT)

( * ) Notice: Subject to any disclaimer, the term of this patent is extended or adjusted under 35 U.S.C. 154(b) by 211 days.

(21) Appl. No.: 14/425,167

(22) PCT Filed: Sep. 4, 2012

(86) PCT No.: PCT/EP2012/003687
§ 371 (c)(1),
(2), (4) Date: May 13, 2015

(87) PCT Pub. No.: WO2014/037016
PCT Pub. Date: Mar. 13, 2014

(65) Prior Publication Data
US 2015/0339001 A1    Nov. 26, 2015

(51) Int. Cl.
*G06F 3/043* (2006.01)
*G06F 1/16* (2006.01)
*G06F 3/041* (2006.01)

(52) U.S. Cl.
CPC .............. *G06F 3/0433* (2013.01); *G06F 1/16* (2013.01); *G06F 3/0414* (2013.01); *G06F 3/0416* (2013.01); *G06F 3/0418* (2013.01); *G06F 2203/04104* (2013.01); *G06F 2203/04106* (2013.01)

(58) Field of Classification Search
CPC .... G06F 3/0414; G06F 3/0416; G06F 3/0418; G06F 3/0433; G06F 3/041; G06F 3/043; G06F 2203/04106; G06F 2203/04104
USPC .................................... 345/173–177
See application file for complete search history.

(56) References Cited

U.S. PATENT DOCUMENTS

| | | | |
|---|---|---|---|
| 5,159,323 A | 10/1992 | Mase et al. | |
| 7,170,770 B2* | 1/2007 | Kang | G11C 11/22 365/151 |
| 8,072,429 B2* | 12/2011 | Grivna | G06F 3/0416 345/173 |
| 8,797,291 B2* | 8/2014 | Lin | G06F 3/044 345/173 |

(Continued)

*Primary Examiner* — Vijay Shankar
(74) *Attorney, Agent, or Firm* — BudzynFortunato IP Law, LLC

(57) ABSTRACT

There is provided an sensing device, comprising: a substrate; a sensor ink printed onto the substrate; a conductive polymer ink printed onto the sensor ink; a conductive carbon paste formed on the polymer ink; and a conductive silver ink printed on the conductive carbon paste. There is also provided a sensing device for processing a signal generated by the input device, the sensing device comprising: an operational amplifier to amplify the signal; a filter to filter signal noise from the signal; an adder to apply an offset and attenuation to the signal; a microcontroller comprising an analog to digital converter to convert the signal into a digital output signal.

33 Claims, 6 Drawing Sheets

(56) References Cited

U.S. PATENT DOCUMENTS

2005/0237779 A1  10/2005  Kang
2008/0150906 A1   6/2008  Grivna
2008/0174852 A1   7/2008  Hirai et al.

* cited by examiner

PRINTED PIEZOELECTRIC PRESSURE SENSING FOIL

BACKGROUND

Over recent years, touch sensing devices have become more and more important. Touch sensing devices can be divided into three different categories: optical, resistive, and capacitive tracking devices.

Optical touch solutions are highly dependent on ambient lighting and the material of the tracking object. In addition, the separation of 'touch' and 'pen' inputs is not easily possible.

Resistive array-based sensors usually consist of two layers of conductive material, one with horizontal lines and one with vertical lines. When a user touches the surface, the horizontal and vertical lanes are alternately connected, enabling the flow of current. Although this approach is inexpensive and energy-efficient, the tracking resolution is limited to the space between the sensing lines. Alternatively, plane-type conductors with well-defined resistivity are used as top and bottom electrodes. The touch signal is measured by applying a voltage to one of the electrodes and detecting the resistance of the other electrode relative to the electrode edges. This is similar to treating the electrodes as a voltage divider. Here the resolution is mainly determined by the sensitivity of the read-out electronic, the separation between the electrodes (spacer) and the homogeneity of the electrodes' conductivity. However, the standard resistive touch panel concept is not suitable for pressure sensing.

From US 2009/0256817 A1 there is known a resistive, pressure-sensitive touch-based input device for tracking both touches as well as pens based on Interpolating Force Sensitive Resistance (IFSR). In this setup, the sensing material is mounted on a paper-thin flexible/bendable material and is able to sense pressure input.

Capacitive touch sensors consist of a thin conductive layer placed on an insulator, such as a glass. This layer serves as the electrode of a capacitor. A touch on the surface results in a distortion of the panel's electrostatic field and is measurable as a change in capacitance. However, capacitive sensing can only measure the touch location (resolution is limited by touch area). It is not suitable for pressure sensing. Another major disadvantage of this technique is that it relies on the dielectric properties of the human body; thus, stylus or objects cannot be tracked.

State-of-the-Art piezoelectric sensing devices exploit the piezoelectric effect only indirectly by detection of touch-induced surface (acoustic) waves via piezoelectric transducers placed at the device corners. Such devices are expensive due to the costs of the required inorganic piezoelectric materials and the involved costly assembling process. They provide only limited user interaction as for example the detection of a motion-less finger is impossible.

WO 2012/025412 A1 describes a method of producing piezoelectric and pyroelectric coatings.

U.S. Pat. No. 8,138,882 B2 describes the use of a sensing device in an "intelligent floor".

Although some of the above mentioned sensor concepts provide multi-touch sensing capabilities, it is often not possible to track the pressure of the input efficiently and accurately. Also, it is desirable to track pen and touch operations separately. In addition, it is desirable to combine the tracking of pen and touch operations with pressure tracking.

The present invention aims to address these and other issues.

SUMMARY OF THE INVENTION

The present invention is defined in the claims.

DESCRIPTION OF EXEMPLARY EMBODIMENTS

Exemplary embodiments of the invention will now be described with reference to the drawings.

Introduction

In an embodiment of the present invention, there is provided a pressure-sensing input device that is based on a ferroelectric material that supports both pyro- and piezoelectric effects. The ferroelectric material can be used for sensing pressures changes on large, flat and/or bended surfaces. The input device has a sandwich structure of four layers that can be printed easily on any material. This material can be used in combination with a high-resolution optical based sensing foil, such as described in US 2011/0310066 A1, or an optical Stytlus as described in US 2012/0127110 A1.

The input device supports both hand and pen input tracking. The foil implementing the device is bendable, energy-efficient, and it can be produced easily in a printing process.

The input device also supports a hovering mode based on the pyroelectric effect.

Piezoelectric Effect

Figure 1:
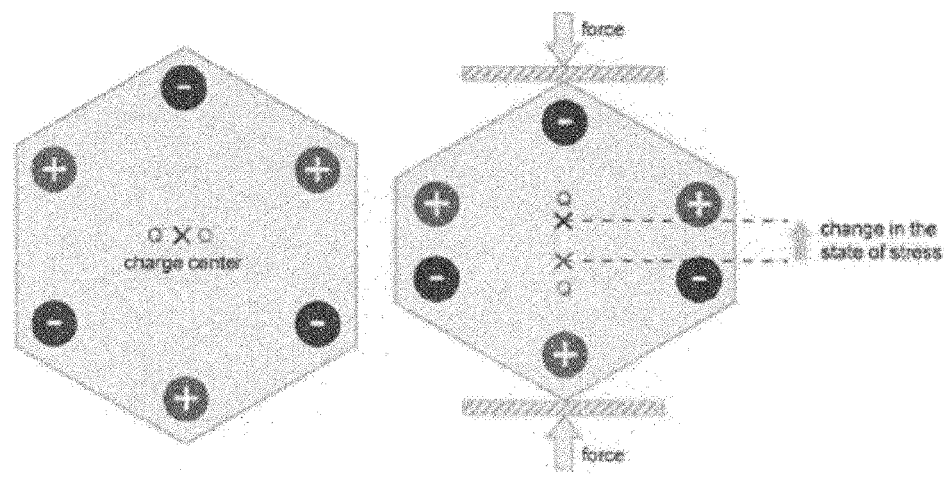
FIG. 1 illustrates the piezoelectric pressure sensing effect. On the left there is shown the distribution and centres of positive and negative charges. On the right there is shown the shifting of the charge centres in the state of stress/force.

Piezoelectric materials are like wet sponges when they are squeezed and water pours out. The amplitude and frequency of the signal is directly proportional to the mechanical deformation of the piezoelectric material. The induced deformation of the piezo-element causes a change in the surface charge density of the material resulting in a voltage between the electrodes (FIG. 1). The piezoelectric coefficient describes the amount of electrical charge generated per applied force unit.

Figure 2:
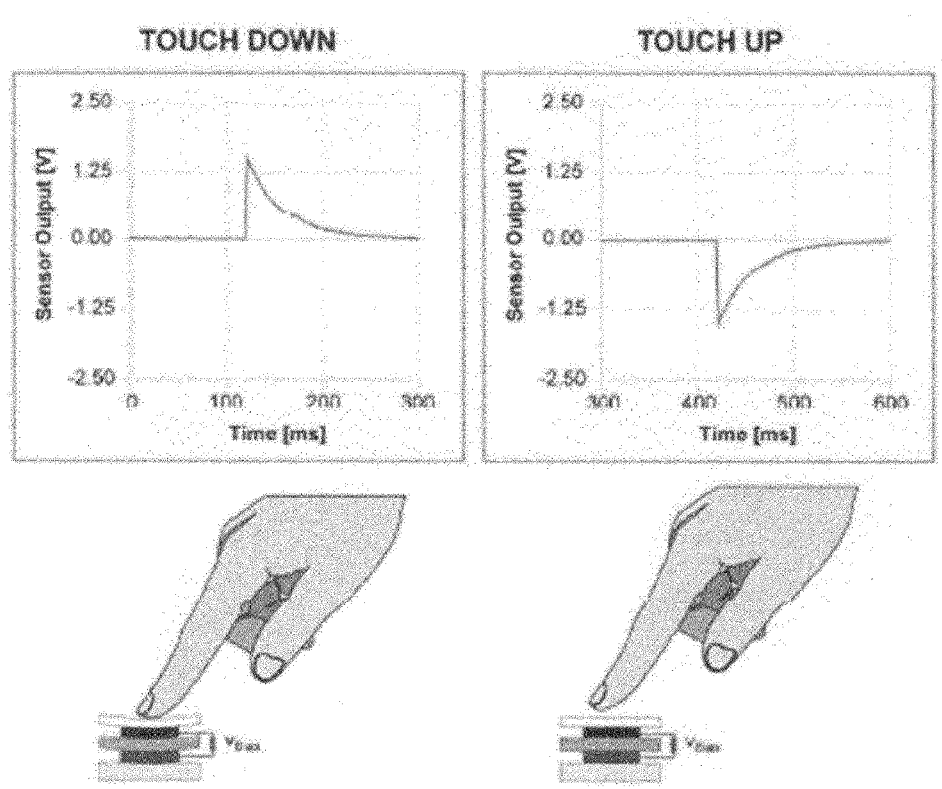
FIG. 2 illustrates a piezoelectric output voltage when a user is touching the surface (left) and lifting the finger (right).

A PVDF film, like all piezoelectric materials, is a dynamic material developing an electrical charge proportional to a change in mechanical stress. As a consequence, piezoelectric materials itself are not suitable for static measurements due to their internal resistance. The electric charges generated in the polymer film decay with a time constant determined by the dielectric constant, the internal resistance of the film and the input impedance of the interface electronics to which the film is connected (FIG. 2).

Pyroelectric Effect

Pyroelectric sensor materials are usually dielectric materials with a temperature-dependent molecular dipole moment. As these materials absorb thermal energy, they expand (or contract). Due to the expansion an indirect piezoelectric signal is caused. A reduction of the average polarization of the film (sum of molecular dipole moments) is caused by random motion of the dipoles upon heating; this generates a charge to be built up on the film surface. Analogous to piezoelectricity and stress, the pyroelectric output current is proportional to the rate of temperature change. The pyroelectric charge coefficient describes the amount of electrical charge generated per degree of temperature change.

According to an embodiment of the invention, based on the afore-mentioned material properties, piezo and pyroelectric polymer films are employed for sensing of pressure and temperature changes in a large area. In particular, by employing a printable formulation of a piezo- and pyroelectric polymer ink, in combination with an appropriate layout of sensors, the fabrication of cost efficient, large-area sensors by screen printing processes is made possible. These sensors are capable of pressure sensing and tracking (touch and/or pen input) as well as detecting the approach or proximity of IR-emitters such as human hands (hovering interaction).

Figure 3:
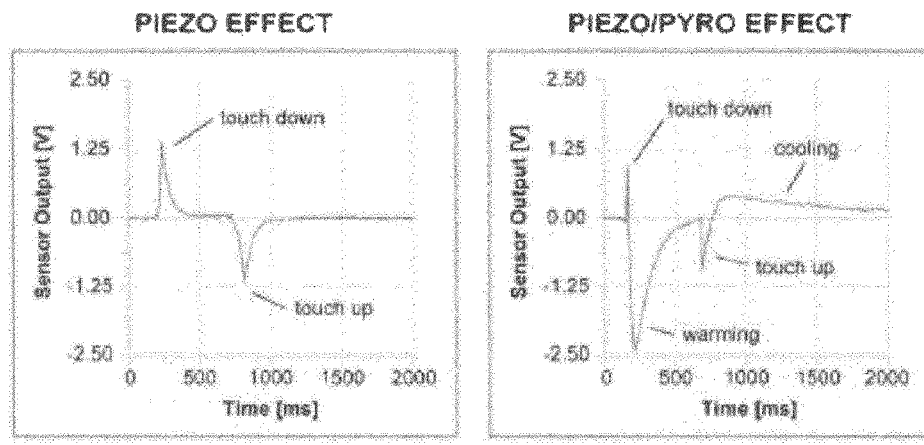
FIG. 3 illustrates output signals from a combined piezo- and pyroelectric sensor, that is a piezoelectric response without pyroelectric effect (left) and a combined piezo- and pyroelectric response (right).

In FIG. 3 the piezoelectric and pyroelectric effects are compared, showing a touch having a duration of about 500 ms. As seen in the right side of FIG. 3, it is highly complex to distinguish the warming and cooling effects from the touch signals. In some situations, these effects can get even more blended. Usually, the piezoelectric foil is highly sensitive against any external light (heat) sources.

These problems can be addressed either by adding an IR-light reflecting layer/lamination which might act as a heat sink as well, thus—reducing the pyroelectric response—or by providing a foil design as described below.

Foil Design

In an embodiment the sensing foil is based on a 16×8 array of screen printed, flexible, capacitive, circular sensor spots having a diameter of 10 mm. The basis of the touch foil is a transparent plastic substrate, which serves as a carrier for the printed materials. In the next step 128 circular spots (electrodes) are printed to the carrier material, which are connected horizontally. Subsequently, the plastic substrate is coated in its entirety with a ferroelectric material. After that, a second layer of vertically connected electrodes is printed. The two layers of electrodes form a capacitor. Charge changes in the ferroelectric sensor layer cause measurable voltages between the electrodes.

Figure 4:
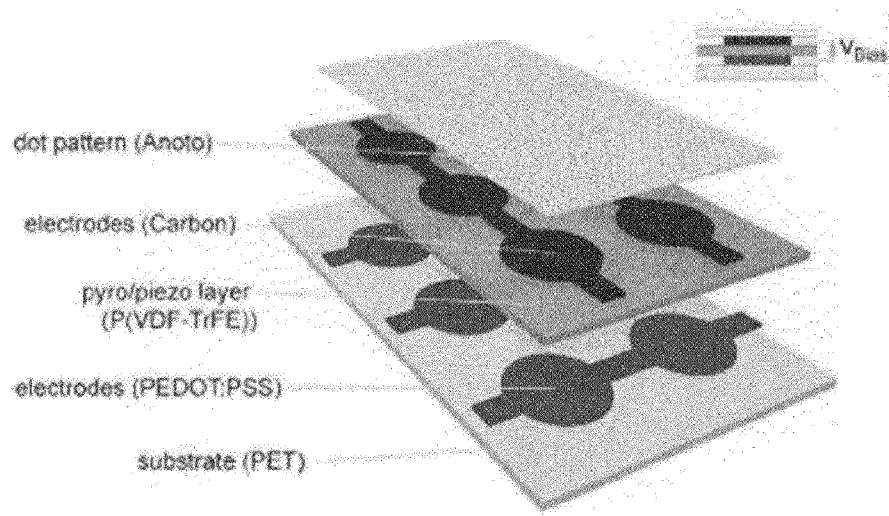
FIG. 4 illustrates the structure of an exemplary sensor.

FIG. 4 shows the sandwich design of the foil structure comprising the following materials:
 a first layer formed by a transparent polyethylene terephthalate substrate (PET),
 electrodes in the second layer formed by a semitransparent conductive polymer material,
 a piezo- and pyroelectric sensor material formed by polyvinylidene difluoride (PVDF) and triflouroethylene (TrFE), which has a transparency of about 85 percent, and
 top electrodes formed by either non-transparent carbon or conductive polymer.

For applications with a strict pen and touch separation (e.g. if a pen is used for annotations and touches are used for manipulations), a stable separation of both inputs is necessary. To achieve this, in an embodiment, the illustrated sensor foil is combined with a foil of the type described in US 2011/0310066 A1 in order to provide a stable pen and touch tracking. Such additional foil acts as a temperature absorbing layer to reduce the pyroelectric response.

Multi Touch

Using the afore described design for multi-touch sensing, so-called ghost points may occur due to the design of the sensor foil. For avoiding "ghosting" at multi-touch input, in an embodiment, a special type of sensor foil is used. The sensor foil comprises two sensor layers having a grid structure of orthogonal top- and bottom electrodes applied on both sides of the substrate. The direction of the top- and bottom electrodes of the two sensor grids are rotated by 45°, thus showing real touch points on both sensor layers at the equal position but generating ghost points at different positions. By subtracting the input signals of both foils, the remaining signals can definitely be attributed to the ghosting points, thus revealing the true touch positions in multi-touch applications.

DESCRIPTION OF A PREFERRED EMBODIMENT

Fabrication of the Sensor Array

Fabrication may be implemented by low-cost printing of a smart active matrix sensor array with four functional inks:
 a fluoropolymer sensor ink,
 a conductive polymer ink,
 a conductive carbon paste, and
 a conductive silver ink.

The sensor ink may be formed by a P(VDF-TrFE) (poly (vinylidene fluoride trifluoroethylene). The polymer ink may be formed by a PEDOT:PSS (poly(3,4-ethylenedioxythiophene):poly(styrene sulfonic acid)) ink.

A substrate is formed by a transparent, flexible (175 μm thick) plastic foil, thereby providing high flexibility and good adhesion of the functional materials (inks) applied during the screen printing process. The sensor ink is based on the pyro- and piezoelectric copolymer P(VDF-TrFE) which has a semi-crystalline structure and can be printed on the foil thus forming a 5 μm thick transparent layer. Silver conductive lines are printed for connecting the sensor electrodes to a Molex 1.00 mm Pitch FFC/FPC connector. After the printing step, each layer undergoes a short annealing treatment at 100° C. only. This calcination provides complete solvent evaporation thus increasing the functional properties (conductivity, piezo- and pyroelectric response) of each layer. Owing to the humble thermal requirements, the overall process can be considered a low temperature fabrication.

For providing improved macroscopic piezo- and pyroelectric response, the randomly ordered and dipole containing nano-crystallites that are embedded in an amorphous matrix are aligned vertically to the sensor electrodes. This can be implemented by hysteresis poling of the sensors using a Sawyer-Tower-Circuit. For sufficient and durable dipole alignment, an electric field in the range of 140 MV/m being twice as much as the coercive field strength is applied. This procedure leads to a very high remnant polarization of 70 mC/m2 at a poling frequency of 10 Hz.

The resulting sensor foil provides printed, large-area, flexible and durable polymer sensors, showing a piezoelectric coefficient $d_{33}$ of 20-30 pC/N, a pyroelectric coefficient $p_{33}$ of 40 $\mu C/m^2 K$ at room temperature, and a Curie temperature of 125° C.

Sensing Electronics

Figure 5:
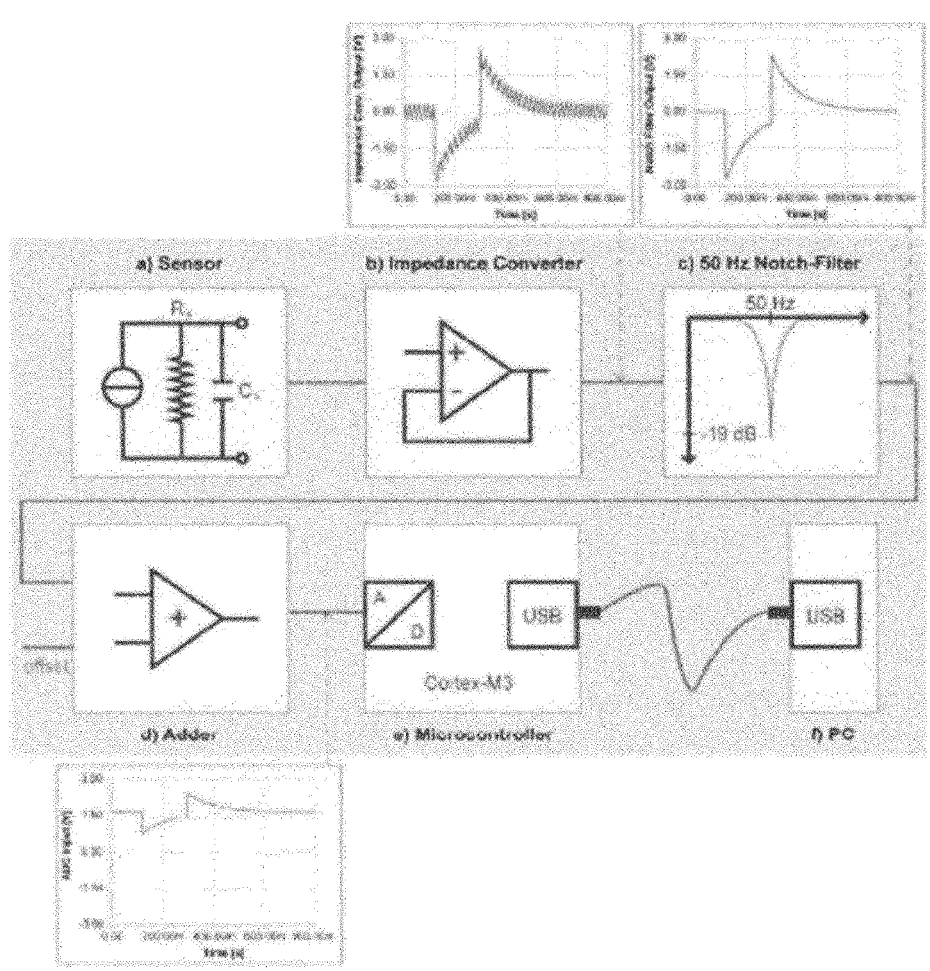
FIG. 5 illustrates sensing electronics according to an embodiment of the invention as a block diagram.

The equivalent circuit of a piezoelectric sensor is a current source with an internal resistance $R_s$ (1 G$\Omega$) and an internal capacitance $C_s$ (1 nF), as depicted in FIG. 5a. The internal resistance and the internal capacitance of the sensor are dependent on the physical dimensions, the electrical conductivity and the permittivity of the used material. Touching the foil generates only a small amount of energy, which is difficult to measure. Therefore, an impedance converter is used to amplify the sensor signal (FIG. 5b). It forwards the input voltage to the output voltage but amplifies the signal power. Preferably the input current is close to zero Ampere. Hence, an operational amplifier that supports an ultra-low input current (less than 10 fA) is preferable. The disadvantage of this type of operational amplifiers is the temperature dependency. Therefore, a less temperature-dependent operational amplifier with 1 pA input current is used and an additional 100 M$\Omega$ input resistance is added. Additionally, the known input resistance provides the back calculation from the signal to the touch force (Newton).

In the next step, the signal noise is reduced. According to the surrounding mains voltage, the electrical noise is around 50 Hz in the signal spectrum. Therefore, a 50 Hz Notch filter is used to remove this noise (FIG. 5c). In the final step, an offset and attenuation is applied to the signal to satisfy the measurement range (0 to 3.3 V) of the micro-controller's internal analogue to digital converter (FIG. 5d).

In the illustrated embodiment, a highly energy-efficient 32-bit Cortex-M3 micro-controller from ATMEL is employed (FIG. 5e). In comparison with other common microcontrollers, the signal processing can be performed on the board more efficiently, because data types are up to 32-bit and high-performance multiplications are supported. Furthermore, a 12-bit analogue to digital converter (one million samples per second) and an integrated USB core unit are used.

Scanning the Sensor Matrix

Figure 6:
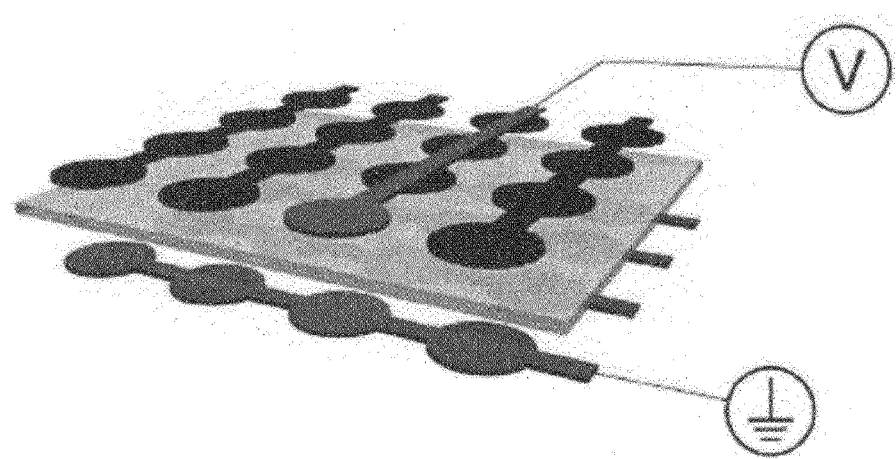
FIG. 6 illustrates the electrodes of a sensor matrix according to an embodiment of the invention.

In an embodiment the sensor matrix has 128 sensor spots covering a 210×130 mm$^2$ area. The electrodes on the bottom are connected horizontally and the electrodes on the top are connected vertically. An ultra-low leakage analogue multiplexer is used to connect the horizontal row to ground. Meanwhile, all other rows are on high impedance (FIG. 6).

Every column is connected to an impedance converter circuit. Additional analogue multiplexers are used to switch on/off the impedance converter outputs to one of the analogue digital converters' inputs of the micro-controller.

All sensor spots are measured and their output voltage is sent to a processing means (computer) every 10 ms. The scan for all 128 sensors takes 4.352 ms (128×34 µs). To sum up, it takes approximately 1 µs for driving the analogue multiplexer, 25 µs for waiting for the multiplexer and filtering circuits to settle to the new sensor output, and finally 8 µs for the A/D conversions. After scanning all sensors, it takes additional 2 µs to configure the DMA controller of the USB Core to send the results to the PC. Due to the short processing time enough capacity is left for larger foils or higher touch point density.

Processing the Touches

Every pressure-change on a sensor spot generates a charge and eventuates in a measurable voltage. If no further pressure-change occurs, the voltage discharges through internal resistance of the piezoelectric film and the input resistance of the measurement circuit. This discharge follows an exponential function and is predictable if the parameters of the exponential function are known.

Every deviation of the predicted value must be caused by a new pressure change on the sensor. This can be used to process the pressure changes from the sensor signal. In an additional step, the pressure progress can be calculated by integrating all pressure changes.

Figure 7:
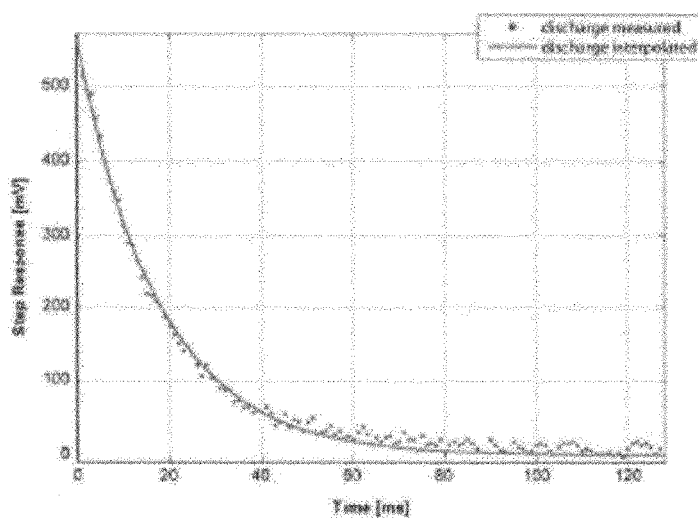
FIG. 7 illustrates an interpolation of a step response by a sensor matrix according to an embodiment of the invention.

When a sampling rate of 100 Hz is used t is 10 ms. The time constant $\tau$ of the exponential function depends on the internal resistance and capacitance of the sensor as well as the input impedance of the measurement circuit. A pneumatic measurement setup may be used to apply repeatable forces to a sensor spot. This setup helps to measure the step response of one single sensor spot. A fitting tool can be used to interpolate the step response with an exponential function (FIG. 7).

Figure 8:
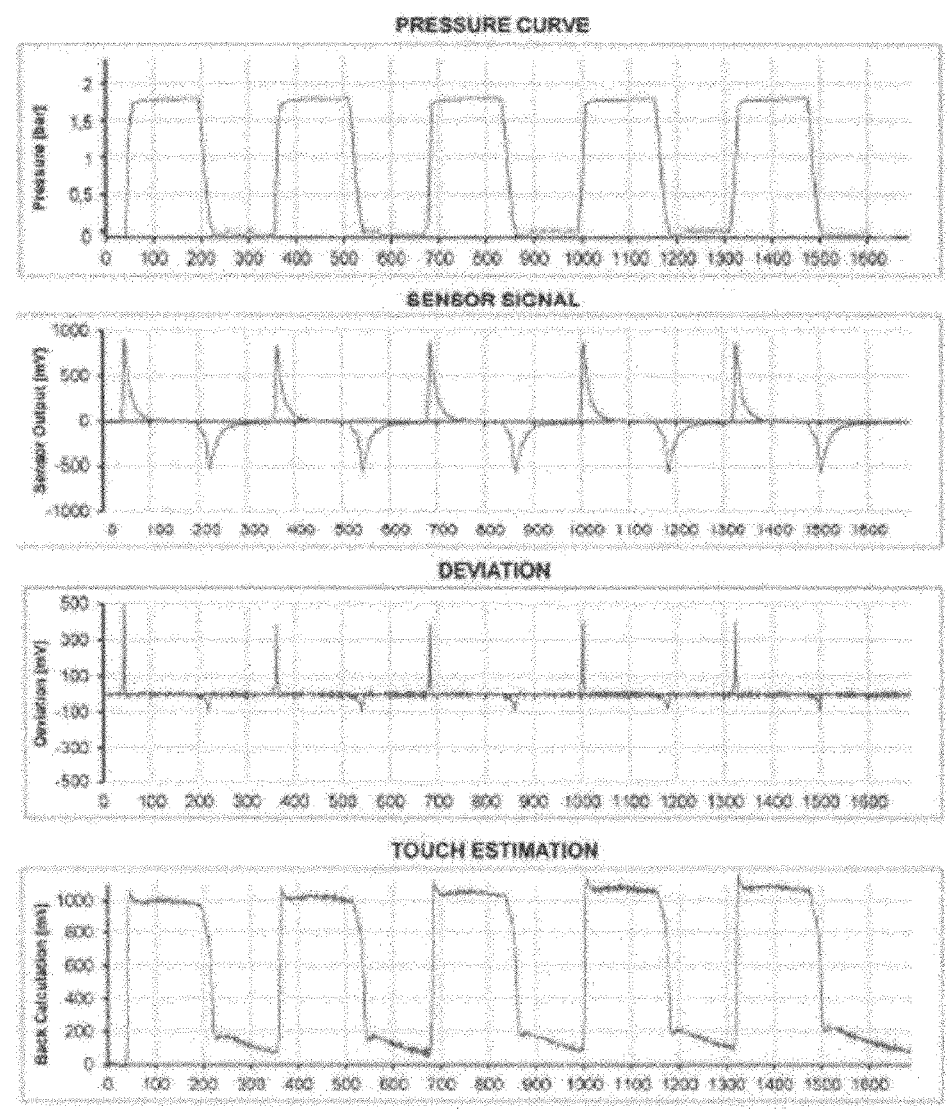
FIG. 8 illustrates the processing of data detected in response to touch operations, including an applied pressure curve (top); the resulting piezoelectric sensor signal (second); the deviation between estimated and measured signal values (third); and an estimated pressure signal obtained by integrating the deviation curve (fourth).

The interpolated exponential function has a $\tau$ of 17.72 ms. Thereafter, all parameters that are required to process the pressure progress from the sensor output, are known. FIG. 8 shows the back-calculation from the sensor output to calculate the pressure. The applied pressure is illustrated in the first graph. The second graph shows the measured output voltage of the sensor. The deviations between the predicted values derived from the exponential function and the measured values (induced by a pressure change) are shown in the third chart. Finally, an integration of the deviations is plotted in the last chart. It can be seen that the voltage progress is proportional to the applied pressure.

Pen & Touch Tracking

To provide a stable solution for a pen and touch tracking, it is preferred to combine the above described foil design with an additional dot pattern, as provided, for example, by ANOTO®.

The pen and touch separation is realized through software-based processing. A combined input driver analyses both pen and touch input data synchronously. Whenever a new touch is performed, the input driver waits for about 50 ms for a pen input at the same spot (within a small threshold). During this period, all touch data gets temporarily stored in the input driver. Whenever a pen input is noticed, the input driver forwards only the pen input and ignores the touch input. Otherwise, the temporarily stored touch data gets regularly forwarded to the applications.

Applications

Human Machine Interface (HMI) with Haptic/Acoustic Feedback

In an embodiment, the sensing device or the present invention is used to implement HMI. The HMI technology based on the PyzoFlex technology has the potential of providing touch-input functionality in a low-cost process by printing over large-areas on flexible substrates, optionally with nearly transparent electrodes. 3D-patterning of the active ferroelectric material by imprinting enables combining passive haptic with acoustic feedback in one functional layer.

In am embodiment, the basic element of the HMI technology is an array of printed ferroelectric sensor capacitors based on the semicrystalline ferroelectric polymer PVDF-TrFE as the dielectric sandwiched between transparent or IR-absorbing electrodes. The sensor is sensitive to changes either in pressure due to its piezoelectric nature or in temperature due to its pyroelectric nature. Such printed capacitive sensor array can be integrated monolithically with organic transistors and display elements and further be utilized as a flexible, easy processable, low-cost user interface that can be controlled either by touch or by proximity (non-touch).

All layers can be deposited by screen printing. If transparent and smooth layers are required, potential materials for the electrodes are (i) PEDOT:PSS or (ii) printable metallic nanowires, as an alternative to current ITO technologies. If low resistivity and/or good IR-absorbance are important, Carbon and Ag are the materials of choice.

In an embodiment, a new membrane button concept is provided. In particular, the printed piezoelectric polymer can serve as a pressure sensor for inputs and as an actuator for tactile feedback, but also as a loudspeaker enabling acoustic feedback.

Figure 9:
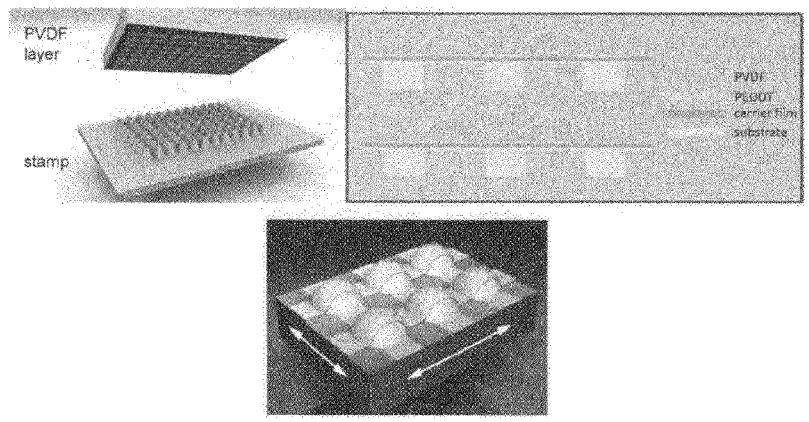
FIG. 9 is a schematic illustration of the imprinting technique by means of hard flat stamps (left hand side), of sensors on structured substrate (middle), and of an array of dome-shaped keypads (right hand side).

As the input device of the present invention is printed, the rigidity of the backbone (substrate) in combination with the adhesion of the printed PVDF-TrFE affects the vibrational output of the sensor device. In an embodiment, in order to amplify the vibrational amplitude for tactile and/or acoustic user feedback, either a structured substrate is used, such as a perforated film, or a polymer film with cavities fabricated by hot embossing/imprinting and an imprinted dome-shaped sensor capacitor. This is illustrated in FIG. 9.

The result is a simple input key with passive haptic feedback based on pressure induced deformation of the keypad which induces charges at the electrodes attached to the active polymer. After signal detection of the key, processing means connected to the input device can generate an active feedback on an actuator/speaker by producing a voltage signal of any defined frequency and amplitude (either for haptic sensing, acoustic sensing or both). The final impression of the feedback given to the user can be freely designed for any purposes and surroundings. The intensity of the feedback signal can be determined by the design of the backbone, the size of the keypads and the signal sent to the sensor. Moreover, it is desirable to optimize the sound response and acoustic pressure of a speaker without effecting the overall key design and functionality. A preferred embodiment comprises the fabrication of dome-shaped PVDF sensors with optimized stiffness for radiating acoustic waves at specified frequencies and sound levels.

(Multi-) Touch Panel

For a piezoelectric multi touch panel, the electrode pattern according to an embodiment of the invention is either an array type with the resolution being limited by the printing process or a triangular type based on a low conducting laminar electrode with higher resolution.

Array Type (Multi) Touch Panel

In an embodiment of the invention there is provided a (multi-) touch panel based on a true piezoelectric sensor, especially generated by a low-cost, printable polymer paste. The embodiments described above can be used for fabricating large area, printed (multi-) touch sensors for different kinds of user interactions. Since the ferroelectric polymer is transparent in the visible range, it can also be used for fabricating touchscreens by means of transparent electrode materials. For reliable triggering of single touch-points, an array-like structure of orthogonally ordered bottom and top electrodes forming piezoelectric active, capacitive areas at the overlapping regions is provided.

Figure 10:
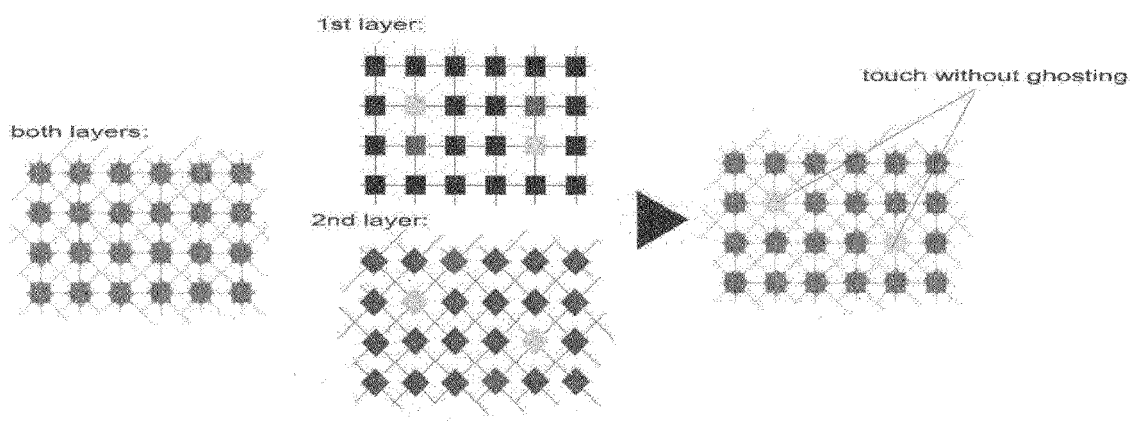
FIG. 10 illustrates the identification of real touch points and ghost points in accordance with an embodiment of the invention.

However, when multi touch gestures are to be captured, the generation of ghost points due charge distribution described by the Kirchhoff's laws becomes difficult in a single layer approach. In an embodiment of the invention, this problem is addressed not by using a combination of complex and costly electronics and software as, for example, it is done in connection with prior art capacitive touch-screens. Rather, in this embodiment, reliable multi-touch recognition is achieved by adding a second sensor layer to the single-touch panel by tilting the direction of the electrodes by 45°. This design allows the determination of the touch inputs by subtracting the piezoelectric sensor signals from both sensor panels, thus eliminating the true touch-points and revealing the ghost-points caused by charge distribution. This is illustrated in FIG. 10.

Laminar Electrode Triangulation Panel

In another embodiment of the invention there is provided a triangulation based piezoelectric touch panel that exploits a difference in resistivity of the electrode materials. In this embodiment the signals are detected in the corner of the sensor foil and due to a distance-dependent decrease of the sensor signal, being related to the series resistance of the low-conducting electrode, the exact location of the excitation point can be calculated.

Laser Safety Wall

In an embodiment of the invention, the active Polymer used within the sensor device is piezo- and pyroelectric (PVDF-TrFE) or can be tuned to be one of both (PVDF-TrFE+nanocomposite), not only the detection of touch input caused by pressure changes but also the change of temperature can be sensed.

By using the sensor structure related to the (multi-) touch panel as described above, local changes of heat can be detected as well. In combination with suitable processing means, spatially resolved changes of heat can be recorded and analysed. This technology can be used for the cost efficient fabrication of active laser safety walls, for example for automated laser welding systems or in the vicinity of automated laser fabrication systems exceeding a certain laser class. For those applications, the thermally sensitive sensor-foil included in the sensing device of the present invention is attached to a passive laser housing (typically consisting of a metal plate of appropriate thickness) for forwarding the heat generated by a defocused or scattered laser beam directly to the sensor array. Processing means are provided to decide if and which kind of hazardous event occurs and to initiate an alarm or shut down the laser system if necessary, depending on the signal distribution and amplitude.

With this embodiment, it is possible to fabricate large area active laser-safety-walls by combining/stitching together an appropriate amount of sensor sheets. This also enables an easy replacement of damaged parts after a hazardous event. Further, the spatial resolution of the sensor sheets allows for simplified error diagnostics since the intensity and position of the temperature rise can be revealed by the processing means.

Energy Harvester

In an embodiment of the invention, the sensing device comprises a passive capacitive sensor which separates charges on the electrodes when a pressure and/or temperature change occurs. Because of these characteristics, the sensor can be employed as an energy converter which converts mechanical and thermal energy to electrical energy. In an embodiment, the sensing device can be used as energy harvester in the vicinity of vibrational changes and/or thermal fluctuations.

The charge generated in response to the detection of mechanical energy depends on the amplitude and frequency of vibrations and/or thermal changes as well as on the sensor area. Preferably, the design of the capacitive energy harvester is adapted to the existing surrounding. In particular, the thickness of the active polymer affects the current to voltage ratio and the size of the active area to be excited relates to the amount of generated charge. For example, using a single HMI-sensor with an area of 0.7 cm$^2$, 3 nC can be generated in a single touch event. By adapting the sensor design, the generated energy can be used, for example, to bias a wireless sensor node within a wireless sensor network in an industrial automation surrounding or any appropriate appliance in the context of ambient assisted living.

Intelligent Floor

The sensing device of the present invention is capable of detecting vibrations over a wide frequency spectrum. Accordingly, the sensing device can be used as a microphones, a solid bone sound sensor, or as an acceleration sensor.

In the context of ambient assisted living (e.g. intelligent floor) and security applications (e.g. detection of vandalism), typical sound patterns indicate certain incidents. In an embodiment of the invention, the sensing device is attached to a surface, for example the walls or floor of a room in a building. The vibrations in/of the surface can be detected and analyzed on the basis of the sensing device's capability of sensing various frequencies.

The acoustic sensitivity of the sensing device can be tuned to a certain frequency band by varying its size, shape and thickness. In the field of security applications, certain events (e.g. breaking glass) can be detected by comparing the recorded signal with a reference database storing data indicative of certain events, thus enabling their detection (e.g. vandalism, accidents or other security relevant events).

In the growing field of ubiquitous computing in daily surroundings (ambient assisted living), one aspect of growing interest is the "intelligent floor" (U.S. Pat. No. 8,138,882 B2).

In an embodiment of the invention, the sensing device is implemented in/on a floor structure. Due to the sensing device's robustness, shape and capability for uses as a sensor for pressure/temperature changes, acceleration sensor and/or solid bone sound sensor, the sensing device enables the detection and tracking of e.g. moving people/animals, acoustic events, temperature changes (e.g. fire) and much more.

It will be appreciated that the above described embodiments are described as examples only, and that modifications to these embodiments are included within the scope of the appended claims.

The invention claimed is:

1. A sensing device, comprising: a substrate; a ferroelectric sensor ink printed onto the substrate to form a first sensor layer; at least one conductive layer formed on the first sensor layer; wherein the at least one conductive layer comprises at least one of: a conductive ink printed onto the first sensor layer to form a first conductive layer, the conductive ink comprising a polymer, Carbon, Ag, Cu and/or metal nanowires; a carbon ink printed on the first conductive layer to form a second conductive layer; and a conductive ink including a silver ink printed on the second conductive layer to form a third conductive layer; wherein the ferroelectric sensor ink comprises a pyro- and piezoelectric polymer, in particular a polymer formed by a copolymer P(VDF-TrFE) or by a relaxor ferroelectric terpolymer P(VDF-TrFE-CFE), and/or wherein the ferroelectric sensor ink is formed by a nanocomposite of inorganic ferroelectric nanoparticles embedded in the pyro- and piezoelectric polymer.

2. The sensing device of claim 1, wherein the at least one conductive layer comprises a conductive ink, in particular a conductive ink comprising a polymer, carbon, silver, Copper, metal nanowires and/or carbon nanotubes printed on the substrate underneath the first sensor layer to form a first conductive layer on the substrate.

3. The sensing device of claim 1, further comprising a plurality of connected first electrodes and a plurality of connected second electrodes with said first sensor layer arranged in between, wherein pairs of overlapping first and second electrodes form capacitors each corresponding to a sensor spot to generate a measurable voltage in response to charge generated in the first sensor layer.

4. The sensing device of claim 1, further comprising a second sensor layer, wherein the second sensor layer is may be provided on the backside of the substrate, in particular by printing, or on top of the first sensor layer, in particular laminated on top of the first sensor layer.

5. The sensing device of claim 4, wherein the first sensor layer comprises a first a plurality of substantially parallel conductive lines, and the second sensor layer comprises a second plurality of substantially parallel conductive lines, wherein the first and second plurality of lines are rotated relative to one another by a predetermined angle, for example 45 degrees, around an axis that extends perpendicular to the longitudinal extension of the first and second plurality of lines.

6. The sensing device of claim 1, comprising dipole containing nano-crystallites.

7. The sensing device of claim 6, wherein the dipole containing nano-crystallites are aligned vertically to the second plurality of electrodes.

8. The sensing device of claim 1, wherein said ferroelectric sensor ink forms an array of printed ferroelectric sensor capacitors, preferably comprising the semicrystalline ferroelectric polymer PVDF-TrFE, formed between transparent or IR-absorbing electrodes.

9. The sensing device of claim 8, wherein said electrodes comprises PEDOT:PSS, printable metallic nanowires, Carbon and/or Ag.

10. The sensing device of claim 8, wherein said substrate comprises a perforated film or a polymer film with cavities, fabricated by hot embossing or imprinting.

11. The sensing device of claim 8, further comprising imprinted dome-shaped sensors, in particular PVDF sensors.

12. The sensing device of claim 11, wherein the dome-shaped sensors are adapted to generate acoustic waves at predefined frequencies and/or sound levels.

13. The sensing device of claim 8, wherein said electrodes comprise first and second arrays of electrodes, wherein said arrays are tilted relative to one another, preferably by 45°.

14. The sensing device of claim 13, comprising processing means to subtract sensor signals from the first and second arrays of electrodes to identify touch locations.

15. The sensing device of claim 8, wherein said electrodes comprise low conductivity laminar electrodes.

16. The sensing device of claim 15, comprising processing means to identify touch locations based on triangulation.

17. The sensing device of claim 1 contained in a laser safety wall.

18. The sensing device of claim 17, wherein the sensing device is attached to a passive laser housing.

19. The sensing device of claim 17, in connection with processing means for processing output signals of the sensing device and, in response to output signals indicative of an event, for generating a signal to trigger a predetermined response, for example an alarm or the shutting down of an associated laser system.

20. The sensing device of claim 1, wherein the sensing device is arranged to generate a signal in response to the detection of vibrations, acoustic waves and/or thermal fluctuations, and preferably to store energy generated by the vibrations, acoustic waves and/or thermal fluctuations.

21. The sensing device of claim 20, wherein the energy is used to bias a wireless sensor node within a wireless network.

22. The sensing device of claim 20, wherein the sensing device is provided to implement a microphone, a solid bone sensor, or an acceleration sensor.

23. The sensing device of claim 20, in connection with processing means to detect the frequency, amplitude, and/or other parameters of said vibrations, acoustic waves and/or thermal fluctuations, to detect events associated with the detected parameters, and optionally to trigger responses, for example an alarm, associated with respective detected events.

24. The sensing device of claim 20, wherein the sensing device is attached to the surface of a building or integrated in a floor.

25. A processing device for processing a signal generated by the sensing device of claim 1, the processing device comprising at least:
    an operational amplifier to amplify the signal;
    a filter to filter signal noise from the signal;
    an adder to apply an offset and/or attenuation to the signal;
    a microcontroller comprising an analogue to digital converter to convert the signal into a digital output signal.

26. The processing device of claim 25, wherein the operational amplifier has an input current of less than 10 fA, preferably 1 pA, and/or wherein the operational amplifier has an input resistance of 50-150 MΩ, preferably 100 MΩ.

27. The processing device of claim 25, wherein the operational amplifier is formed by an impedance converter.

28. The processing device of claim 25, wherein the filter is a notch filter, preferably a 50 Hz notch filter.

29. The processing device of claim 25, arranged to process a signal generated by the input device of claim 5, wherein each pair of overlapping first and second electrodes is connected to a respective one of a plurality of impedance converter circuits.

30. The processing device of claim 29, further comprising a multiplexer to selectively connect the outputs of the plurality of impedance converter circuits to the analogue to digital converter.

31. The processing device of claim 29, further comprising processing means arranged to predict a sensor value by determining a function indicative of the discharge of the voltage between a pair of first and second electrodes corresponding to a sensor spot.

32. The processing device of claim 31, wherein the processing means is arranged to determine a pressure change on the sensor by detecting a deviation of the sensed voltage between said pair of first and second electrodes corresponding to a sensor spot and the predicted value.

33. The processing device of claim 25, further comprising processing means arranged to:
    receive input data representative of pen and touch operations;
    detect and separate data representative of pen and touch operations; and
    when a touch operation is detected at a sensor spot, wait for a predetermined period for detection of a pen operation at the same sensor spot, and, if a pen operation is detected, to forward the pen data but not the touch data for additional processing, and otherwise to forward the touch data.

* * * * *